United States Patent [19]

Matsuzaki et al.

[11] Patent Number: 4,689,638

[45] Date of Patent: Aug. 25, 1987

[54] THERMAL RECORDING HEAD AND PROCESS FOR MANUFACTURING WIRING SUBSTRATE THEREFOR

[75] Inventors: Toshio Matsuzaki, Yokohama; Haruo Sorimachi, Tokyo; Kiyoshi Satoh, Suzaka; Takumi Suzuki; Takeshi Sugii, both of Yokohama, all of Japan

[73] Assignee: Fujitsu Limited, Kawasaki, Japan

[21] Appl. No.: 712,713

[22] Filed: Mar. 18, 1985

[30] Foreign Application Priority Data

| | | | |
|---|---|---|---|
| Mar. 26, 1984 | [JP] | Japan | 59-56149 |
| Mar. 13, 1985 | [JP] | Japan | 60-49816 |

[51] Int. Cl.[4] ..... G01D 15/10

[52] U.S. Cl. ..... 346/76 PH; 400/120

[58] Field of Search ..... 346/76 PH, 139 C; 219/543; 400/120; 338/309

[56] References Cited

U.S. PATENT DOCUMENTS

| | | | |
|---|---|---|---|
| 3,988,569 | 10/1976 | Henrion | 219/543 |
| 4,259,564 | 3/1981 | Ohkubo et al. | 346/76 PH |

*Primary Examiner*—Arthur G. Evans
*Attorney, Agent, or Firm*—Staas & Halsey

[57] ABSTRACT

A thermal recording head comprising an insulating substrate which has thereon a heat generating resistor pattern made of a thin-film resistor, an electrode pattern having a common power supply electrode pattern portion and a common grounded electrode pattern portion, for supplying the power to the resistor pattern, and a controlling electrode pattern portion, and switching elements for controlling the supply of the power to the resistor pattern. The electrode pattern is made of a thick-film copper paste by a printing process. The operation of the switching elements is controlled by the controlling electrode pattern portion.

Also disclosed is a process for manufacturing a wiring substrate for a thermal recording head.

13 Claims, 11 Drawing Figures

THERMAL RECORDING HEAD AND PROCESS FOR MANUFACTURING WIRING SUBSTRATE THEREFOR

BACKGROUND OF THE INVENTION

The present invention relates to a thermal recording head to be used for a thermal or heat transfer printer or facsimile. More particularly, the present invention relates to a multi-layer wiring structure of a film type thermal recording head provided with active elements, such as driver integrated circuits (IC's), at a high density.

The present invention also relates to a process for manufacturing a wiring substrate which can be advantageously used for a thermal recording head.

A thermal recording head (thermal head) of the above type ordinarily comprises a number of heat-generating parts (heat-generating elements) arranged in a line-dot pattern or matrix, each heat-generating part including a dot formed of a heat-generating resistor (resistor film) and a conductor (film) connected thereto. For example, in the line-dot arrangement, if a recording paper has, for example, a size A4, and the density of the heat-generating parts is 8 lines/mm, about 1728 heat-generating dots are linearly arranged as a whole. Accordingly, in the thermal head of this type, high-density wiring is required for supplying electricity to these heat-generating parts, and therefore, a multi-layer wiring structure becomes necessary. In an IC type thermal recording head for use with A4 size recording paper, the number of heat generating dots is, for example, 1728 as mentioned above, and the power voltage (designated by +E in FIG. 1) is 12 V. In this kind of thermal head, if the heat generating dots are divided into four groups to be driven, then when all the dots are driven, namely when a recording electric current is supplied to all the dots, 50 mA of the current is supplied to each dot at most, but a large current of about 22A is supplied to the power supply lines. That is, a large current flows in the power supply lines, in comparison with each heat generating dot in which only a relatively small current flows.

The multi-layer wiring structure is divided into a thick film type (comprising a thick film conductor layer and a thick film insulator layer) and a thin film type (comprising a thin film conductor layer and a thin film separator layer). The former type is advantageous in that fabrication is easy, the manufacturing cost is cheap, the yield is high, and the reliability is high, but is defective in that the printed letter quality (the deviation of the resistance among dots and the resolving degree) is poor and the material cost is high (Au metal films should be used because of various limitations). The latter type is unsatisfactory in several points, but has the advantage of good quality printed letters (the deviation of the resistance among dots or the resolving degree). Accordingly, thin film type thermal heads are use to a great extent at present.

The wiring pattern of the thermal head of this type is typically divided into a diode matrix type and a driver IC-loaded type. Because of the wiring characteristics, the printing speed of the latter type is higher than that of the former, and thus the latter type has an advantage in this point. Accordingly, as means for simultaneously obtaining a good quality printed letter and a high printing speed, a thin film thermal head of the driver IC type has attracted attention, and investigations have been made on thermal heads of this type. Nevertheless, there are still problems with thermal heads of this type, especially for the multi-layer structure for multi-layer wiring, as described in the following text.

As pointed out above, high-density multi-layer wiring is necessary for a driver-loaded type thermal head provided with IC's and the like at a high density. In the conventional thin-film thermal heads of this type, the multi-layer structure for multi-layer wiring is constructed by laminating thin films. More specifically, this multi-layer structure is formed by alternately laminating a thin film conductor layer and a thin film insulator layer of an organic material such as a polyimide resin on a substrate composed of alumina or the like by vacuum deposition or the like. Although conventional thin film-type thermal heads fabricated in the above-mentioned manner are advantageous in that the printed letter quality is high and the printing speed is high, they still involve the following problems.

(1) Since pinholes are readily formed in a thin film of a polyimide resin and short circuits are often formed in the insulation between conductors, the yield in the production process is very low. Accordingly, the number of layers is practically limited to two (the larger the number of layers, the lower the yield), when a thin film of a polyimide resin is used. Moreover, the process for the preparation of a polyimide resin is complicated, and hence, polyimide resin films are expensive.

(2) For the reasons set forth in (1) above, the manufacturing cost is increased and thus the cost of the thermal heads is increased.

(3) Since the conductor layer is in the form of a thin film, the conductor resistance is high. Accordingly, a special device is necessary for a power source supply line or power ground line (earth line) where a large electric current flows. For example, the conductor resistance is reduced by subjecting such a line to a plating treatment (the conductor is thickened) or to a partial vacuum deposition treatment, or the conductor resistance is reduced by complicating a pattern of the thin film and broadening the width of the pattern. Accordingly, where a thermal head is constructed by performing the above-mentioned special or additional treatment, design of multi-layer wiring is very difficult. Moreover, the thermal head is poor in general-purpose characteristics. Namely, multi-layer wiring of a thermal head of a different type cannot be utilized for the present thermal head, and multi-layer wiring suitable for this thermal head must be especially designed.

In another conventional technique, in order to obviate the problems of the above-mentioned conventional technique, a portion including a terminal part where a large electric current flows is constructed by using a separately formed flexible printed plate. However, this flexible printed plate is very expensive and thus the manufacturing cost is increased, and therefore, this conventional technique is not satisfactory from a practical viewpoint.

According to still another conventional technique, a driver IC-loaded portion of a multi-layer wiring is formed having a thick film multi-layer structure, and a heat-generating dot portion is formed having a thin film structure, and both portions are electrically connected to each other by using a bonding wire or the like. In this case, however, the density of electric connecting points between the two portions is very high and the number of these electric connecting points is drastically increased (as pointed out hereinbefore, 1728 points for A4 recording paper), also suitable connecting method is known and the reliability of the connecting points is extremely low. Therefore, this conventional technique cannot be practically applied. Furthermore, even if this conventional technique is practically carried out, the number of steps is increased and thus the manufacturing cost is increased.

SUMMARY OF THE INVENTION

A primary object of the present invention is to solve the above-mentioned problems of the conventional techniques and provide a thermal recording head of the thin film type including a thin film resistor, in which a multilayer structure of a multi-layer wiring portion provided with active elements (such as driver IC's) at a high density can be fabricated very easily with high yield, high-density wiring, high printing speed and high printed letter quality can be realized, and the manufacturing cost can be reduced. Another object of the present invention is to provide a simple and inexpensive wiring substrate which has a high electrical quality and which can be particularly advantageously used for a thermal recording head.

Still another object of the present invention is to provide a process for manufacturing a wiring substrate which is free from the drawbacks mentioned above.

In order to achieve the objects mentioned above, according to the present invention, there is provided a thermal recording head having a multi-layer wiring structure provided with active elements at a high density, which comprises a substrate, a first conductor layer formed of a thick film and arranged on the substrate, a first insulator layer formed of a thick glass film and arranged on the first conductor layer, a heat-generating resistor layer formed of a thin film and arranged on the first insulator layer, a second conductor layer formed of a thin film and arranged on the resistor layer, and active elements arranged on the second conductor layer.

Moreover, in accordance with the present invention, there is provided a thermal recording head having a multi-layer wiring structure provided with active elements at a high density, which comprises a substrate, a first conductor layer formed of a thick film and arranged on the substrate, a first insulator layer formed of a thick glass film and arranged on the first conductor layer, a heat-generating resistor layer formed of a thin film and arranged on the first insulator layer, a second conductor layer formed of a thin film and arranged on the resistor layer, a second insulator layer formed of a thick film and arranged on the second conductor layer, a third conductor layer formed of a thin film and arranged on the second insulator layer, and active elements arranged on the third conductor layer.

According to another aspect of the present invention, there is provided a thermal recording head comprising an insulation substrate having thereon a heat generating resistor pattern made of a thin-film resistor, a predetermined electrode pattern having a common power supply electrode pattern portion and a common grounded electrode pattern portion, for supplying the power to the resistor pattern, a controlling electrode pattern portion, and switching means for controlling the supply of the power to the resistor pattern. The electrode pattern is made of a thick-film copper paste by a printing process. The switching means is controlled by the controlling electrode pattern portion.

According to still another aspect of the present invention, there is also provided a process for manufacturing a wiring substrate for a thermal recording head, comprising: forming a lower layer of a first conductor pattern of a thick copper film by applying and firing a copper paste on an insulating substrate; forming a glass insulator on the lower layer by applying a glass paste onto the first conductor pattern so that at least a part of the conductor pattern is exposed, and then firing the glass paste in an inert gas atmosphere which contains a high density content of oxygen; removing oxide formed on the exposed surface of the first conductor pattern; and forming an upper layer of a second conductor pattern, which is electrically connected to the exposed surface of the first conductor pattern, on the glass insulator.

BRIEF DESCRIPTION OF THE DRAWINGS

The invention will now be described in detail with reference to the accompanying drawings, in which.

DESCRIPTION OF THE PREFERRED EMBODIMENTS

Figure 1:
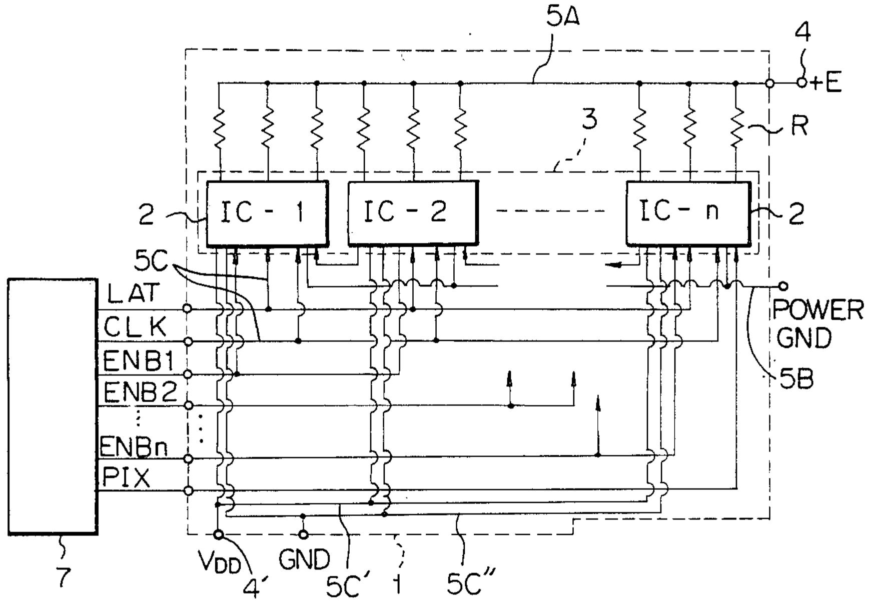
FIG. 1 a circuit diagram of a direct drive thermal head to which the present invention is applied.
Figure 2:
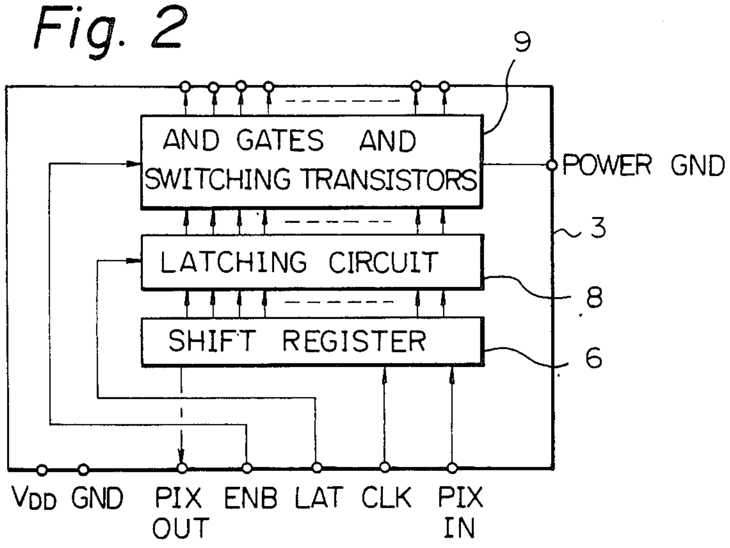
FIG. 2 is a diagram of a drive circuit shown in FIG. 1.

FIG. 1 is a circuit diagram for a direct drive thermal head, and FIG. 2 is a diagram of a drive circuit shown in FIG. 1.

The thermal recording head 1 has a plurality of integrated circuits 2, hereinafter referred to as IC-1, IC-2, . . . IC-n, which form a drive circuit 3. The drive circuit 3 has a shift register 6 which stores picture signals fed from a terminal PIX-IN and which operates in response to a clock signal CLK, as shown in FIG. 2. The picture signal PIX includes dot signals corresponding to a desired letter or picture to be recorded. The drive circuit 3 also has a latching circuit 8 and switching circuit 9. The latching circuit 8 operates in response to a latch signal LAT to control the shift register 6. The switching circuit 9 operates in response to enable signals ENB (ENBl, ENB2, ... ENBn) to control the latching circuit 8 in such a manner that the dot signals are moved at one time to a common conductor 4 through heat generating resistors R. Namely, 4 designates a power source +E for supplying a heat generating current to the heat generating resistance 6; 4' designates a power source $V_{DD}$ for supplying drive current to the drive IC's 2; 5A a power supply line for the power source 4; 5B a ground line for the power source 4; 5C a matrix wiring for supplying control signals for the drive IC's 2; 5C' a power supply line for the power source 4'; and 5C" a ground line for the power source 4'. Numeral 7 designates a control circuit of the thermal head 1. The current from the power source 4 flows to the power supply line 5A, 9 selected heat generating resistance R, driven switching transistors, the grounded line 5B to effect a desired printing. The construction per se mentioned above is known. The present invention is addressed to an internal construction of the thermal recording head 1.

FIGS. 3 through 6 are diagrams illustrating embodiments of the thermal recording head (thermal head) of the present invention.

Wiring components 15A, 15B, 15C, 15C', and 15C" shown below in FIGS. 3 to 6 correspond to 5A, 5B, 5C, 5C', and 5C" in FIGS. 1 and 2, respectively.

Figure 3:
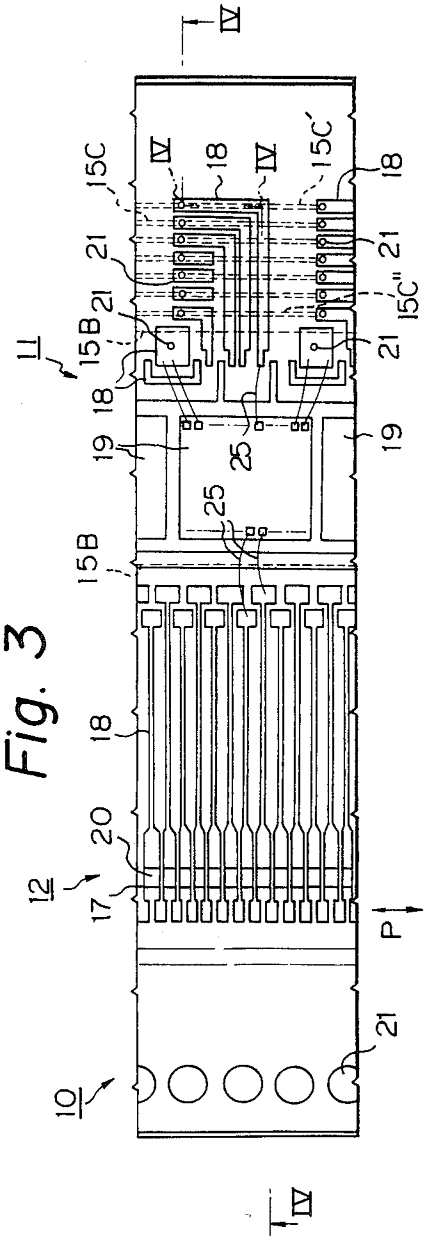
FIG. 3 is a schematic partial plan view showing the first embodiment of the thermal recording head of the present invention, but in which the resistor protecting film, protecting layer and heat-resistant protecting resin shown in FIG. 4 are removed.
Figure 4:
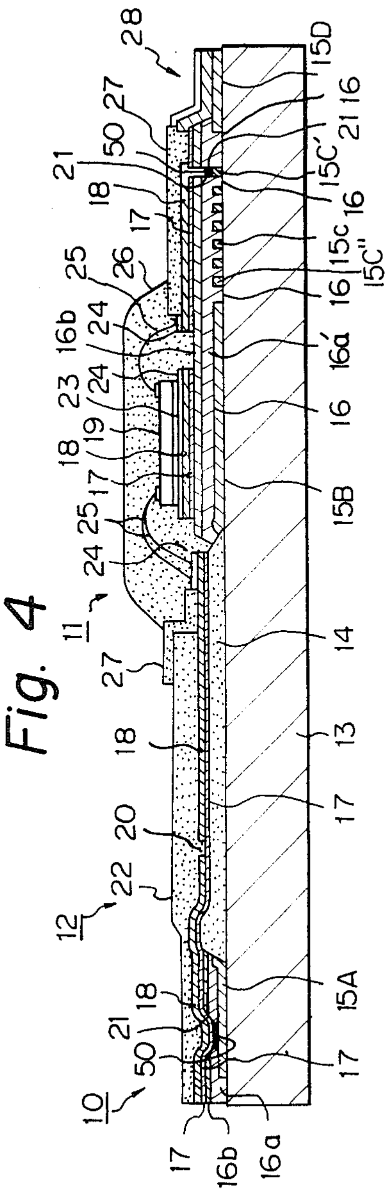
FIG. 4 is a cross-sectional view showing the section taken along the line IV—IV—IV—IV in FIG. 3.

FIGS. 3 and 4 show a thermal head 10 of the first embodiment of the present invention. In FIG. 3, a register protecting film 22, a protecting layer 26, and a heat-resistant protecting resin 27, shown in FIG. 4, are removed, and, practically, the structure is expanded in the direction of arrow P in the rectangular form. In FIGS. 3 and 4, reference numerals 11, 12, 13, 14, 15, 16, 17, 18, 19, and 20 represent a multi-layer wiring portion, a heat-generating portion, an alumina substrate, a high-melting point glaze layer, a first conductor layer, a first insulator layer, a heat-generating resistor layer, a second conductor layer, a driver IC (active element) and a heat-generating point (heat-generating element or heat radiative element), respectively. The present embodiment roughly comprises the multi-layer wiring portion 11 loaded with driver IC's 19 and the heat-generating portion 12 on which heat-generating points 20 are formed. The alumina substrate 13 is a plate composed of about 97% alumina and has a rectangular shape (the longitudinal direction agrees with the direction of arrow P). The high-melting-point glaze layer 14, i.e., heat insulating layer, having a high heat resistance is formed in advance below the resistor layer 17 on which the heat-generating points 20 are formed, that is, on the substrate 13 in the portion corresponding to the resistor layer 17, to prevent heat transmission from the heat generating element 20 to the substrate 13. The first conductor layer 15 is a thick film of Cu (copper) formed by screen printing with a Cu (copper) paste capable of being sintered in an inert gas (e.g., $N_2$=nitrogen) atmosphere, subsequent preliminary drying, and sintering in a conveyer type nitrogen furnace. This first conductor layer is patterned and formed when there are printed a logic power source supply line ($V_{DD}$) 15C', a logic ground line 15C", a head common electrode (power supply electrode) 15A, a power ground line (earth line) 15B, a connection terminal 15D, and matrix wiring electrodes (controlling electrodes, i.e., signal lines) 15C of an input line where the conductor resistance should be reduced because a large electric current flows. By thus constructing the first conductor layer 15 by a thick film of Cu, the area resistance (sheet resistivity) can be reduced to less than about 1/10 of the sheet resistivity in a conventional thin film conductor, and simultaneously, the manufacturing cost can be reduced (because the preparation step is simple). The first conductor layer 15 may be formed of a thick film of Au or Ag-Pd instead of the above-mentioned thick film of Cu. Then, the first insulator layer 16 is formed on the first conductor layer 15 in the form of a thick glass film having exposed portions, i.e., throughholes or via-holes 21, by using a glass paste comprising a binder capable of being sintered in an inert gas (e.g., $N_2$) atmosphere containing a high density oxygen content. In this first insulator layer 16, throughholes 21 should be formed very precisely so as to connect the upper and lower conductor layers (15 and 18). For this purpose, the following contrivance is made in the present embodiment. This glass thick film 16 comprises at least two glass layers. A filler-containing crystalline glass layer for a thick film is formed as a first glass layer 16*a* by printing, and then a vitrous (amorphous) glass layer is laminated as a second glass layer 16*b* on the first glass layer 16*a* by printing, and these two glass layers are integrated to form the thick layer 16. A very smooth surface (top surface) is formed by the second glass layer 16*b* which has excellent flowability when heated. Through holes 21 of the first and second glass layers are formed at the time of printing. Preferably, the diameter of the throughholes 21 of the second glass layer are originally slightly larger than the diameter of the throughholes 21 of the first glass layer, in view of the flowability of the second glass layer 16*b*, so that when heated the throughholes 21 of the first and second glass layer become substantially identical to each other, resulting in a formation of precise throughholes. Thus, the upper and lower conductor layers (15 and 18) can be firmly connected to each other. By constructing the first insulating layer 16 by the thick glass film having the above-mentioned structure, there can be obtained a surface (top surface) having an excellent smoothness and a good insulating property. Moreover, formation of pinholes can be prevented substantially completely, and the yield can be improved. The very smooth face (top surface) makes it easier to form a fine pattern of a thin film thereon and improves the quality of this thin film. Incidentally, the first insulator layer also may be formed according to a method different from the above-mentioned method. More specifically, the first glass layer 16*a* is formed by using an amorphous glass having a high softening point, and the second glass layer 16*b* is formed by using an amorphous glass having a softening point lower than that of the first glass layer 16*a*. Also, in this case, the same effects as described above can be similarly attained. An example of formation of the above-mentioned first insulator layer 16 comprising a first glass layer of a crystalline glass and a second glass layer of an amorphous glass will now be described. At first, a first glass layer 16*a* is formed by repeating two times the printing and sintering of a filler-incorporated crystalline glass paste capable of being sintered at 600° C. by using a 325-mesh screen. Then, a second glass layer 16*a* having throughholes having a minimum diameter of 250 μm and also having a very smooth surface (top surface) is formed by conducting once the printing and sintering of an amorphous glass paste capable of being sintered at 600° C. by using a 325-mesh screen. Both the glass layers 16a and 16b are integrally laminated to form a first insulator layer 16.

In the course of firing the glass paste in an inert gas atmosphere containing a high density oxygen content, the exposed surface of the first conductor layer 15 is oxidized, so that oxide is formed. To remove the oxide, the substrate having thereon the first conductor layer 15 and the glass insulator layers 16a and 16b is dipped or immersed in an organic solvent containing an organic acid, such as carbolic acid, hydroxy acids, or carboxylic acids, or a mixture thereof, so that the oxide is activated and removed. The organic solvent used is preferably selected from the group of halogenated hydrocarbons and aromatic hydrocarbons. Preferably, the organic acid is used in the organic solvent in an amount of 3 to 50% by weight of the total weight.

The density of oxygen contained in the inert gas atmosphere is preferably 200 to 5000 ppm. After the oxide is removed, a heat-generating resistor layer 17 is formed as a thin film on the first insulator layer 16. According to an example of the formation of this resistor layer 17, $Ta_2N$ is deposited in a thickness of about 300 Å by the magnetron sputtering method. Then, a second conductor layer 18 is formed as a Cr-Cu-Cr thin film on the heat-generating resistor layer 17. According to an example of the formation of the second conductor layer 18, by vacuum deposition or the like, Cr is first deposited in a thickness of 300 Å, Cu is then deposited in a thickness of 5000 Å on the deposited Cr, and finally Cr is again deposited in a thickness of 300 Å on the deposited Cu, whereby a Cr-Cu-Cr thin film is formed. Incidentally, Cr is deposited as the topmost layer in the second conductor layer 18 because the adhesion between the resistor-protecting film 22 and this conductor layer 18 is thus improved. Then, pattern baking is carried out by using a negative type resist and only the Cr-Cu-Cr conductor is wet-etched to form a stripe pattern (see FIG. 3 and FIG. 6 described hereinafter). Incidentally in the present embodiment, as pointed out above, the logic power source supply line, the logic ground line, the power ground line and the like are formed on the first conductor layer 15, and therefore, from the viewpoint of design, the present embodiment, is advantageous in that only a fine pattern needs to be provided of the second conductor layer 18 which can be done at a high efficiency. By reactive plasma etching using a $CF_4$—$O_2$ type gas, the $Ta_2N$ layer is removed between patterned conductors of Cr-Cu-Cr. Then, the resist is peeled, and for forming heat-generating points (heat-generating elements) 20, a resist is formed on the entire surface again, and a resist pattern opened only in resistor windows (corresponding to heat-generating points 20) is formed by baking. Subsequently, the Cr-Cu-Cr layer (second conductor layer 18) in the above-mentioned openings is removed by etching to form heat-generating points 20, that is, a thin film resistor. Note, the second conductor layer 18 may be formed by using a single layer or multi-layer of Al, NiCr-Au-Cr, Al(Si), Ti-Pd-Au, Ni-Au, NiCr, Cr, W, Ta, Cu, Ti, Ni, W-Al, Pd, or Au thin film instead of the above-mentioned Cr-Cu-Cr. However, where the second conductor layer 18 is formed by using NiCr-Au-Cr and the first conductor layer 15 is formed of Cu, the exposed surface of this Cu should be plated with Ni to protect the Cu surface from the etching medium used. Namely, the exposed Cu surface can be also etched if it is not covered by such Ni plating. The Ni plating shown at 50 in FIG. 4 is formed after the glass insulator layers 16a and 16b are formed. In this embodiment, reference numeral 22 represents a resistor-protecting film (anti-abrasive layer) of the $SiO_2$-$Ta_2O_5$. $SiO_2$ type, and this protecting film 22 is formed in a thickness of, for example, about 4 μm, by RF (Radio Frequency) sputtering. The driver IC (active element) 19 is loaded and secured onto the second conductor layer 18 by using a conductor adhesive (electrically conductive die-bonding resin) 23 according to the die-bonding method. In order to improve the wire bondability, an Ni-Au plating layer is previously deposited on the second conductor layer 18 (for example, after etching and removal of the Cr of the bonding pad portion, electrolytic plating is carried out). Heat compression Au-to-Au wire bonding is carried out by using a bonding wire 25 (for example, an Au wire) to electrically connect the driver IC 19. As is apparent from the foregoing description, according to the present embodiment 10, the thermal head can be designed so that the driver IC and the like are not wire-bonded to an organic insulator which is mechanically and thermally weak, such as a polyimide resin, and therefore, a multi-layer structure having a very high reliability can be realized. Note, reference numeral 26 represents a protecting layer for the driver IC 19, which is formed of a silicone type resin. According to the above-mentioned procedures, the driver IC type thermal head is substantially constructed. Practically, however, the alumina substrate 11 is secured and loaded onto a rectangular heat sink (not shown), and an external terminal (not shown) is formed on this heat sink to complete fabrication of a driver IC type thermal head. Note, in FIG. 2, reference numerals 27 and 28 represent a heat-resistant protecting resin and a terminal portion, respectively.

As is apparent from the foregoing description, in the present embodiment, thin film layers and thick film layers are appropriately combined, and the multi-layer structure is formed by skillfully utilizing the merits of these layers.

Figure 5:
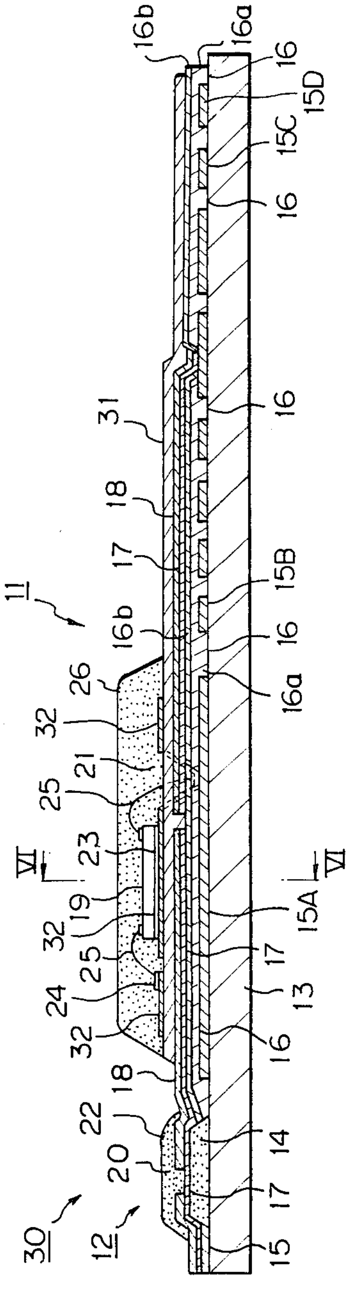
FIG. 5 is a cross-sectional view of a second embodiment of the present invention, corresponding to FIG. 4.
Figure 6:
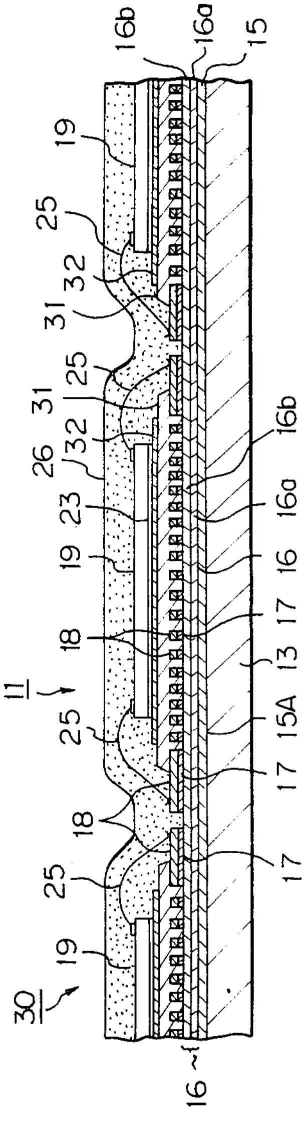
FIG. 6 is a view showing the section taken along the line VI—VI in FIG. 5.

FIG. 5 is a cross-sectional view of a thermal head 30 of a second embodiment of the present invention (corresponding to FIG. 4 of the above mentioned first embodiment), and FIG. 6 is a view showing the section taken along the line VI—VI in FIG. 5 (corresponding to the view showing the section taken along the direction of arrow P in FIG. 3). In FIGS. 5 and 6, members and portions identical or corresponding to the members and portions in FIGS. 3 and 4 are indicated by the same reference numerals as in FIGS. 3 and 4. Therefore, reference numerals 11, 12, 13, 14, 15, 16, 17, 18, 19, 20, 21, 22, 23, 24, 25, and 26 represent a multi-layer wiring portion, a heat-generating portion, an alumina substrate, a high-melting-point glaze layer, a first conductor layer, a first insulator layer, a heat-generating resistor layer, a second conductor layer, a driver IC (active element), a heat-generating point (heat-generating element), a throughhole, a resistor protecting layer (anti-abrasive anti-oxidation layer), a conductor adhesive (electrically conductive die-bonding resin), an Ni-Au plating layer, a bonding wire (Au wire), and a protecting layer for the driver IC 19, respectively. These members and portions are formed substantially in the same manner as in the above-mentioned first embodiment. Accordingly, explanation of these members and portions is omitted.

Reference numerals 31 and 32 represent a second insulator layer and a third conductor layer, respectively. The main difference of the present embodiment from the first embodiment resides in that the second insulator layer 31 and third conductor layer 32 are interposed between the second conductor layer 18 and the driver IC 19. If a small driver IC is used, wiring is ordinarily completed with the second conductor layer 18 as in the above-mentioned first embodiment. However, if a large driver IC having a large current capacitance (or driver LSI) is used, pads on the IC are often distributed and arranged on the four peripheral portions. Where an IC having such pad arrangement and size is loaded, a certain third conductor layer 32 becomes necessary. In the present second embodiment, an example of a driver IC-loaded thermal head having a multi-layer wiring portion 11 including such a third conductor layer 32 is constructed. A variety of large driver IC's having different pad arrangements have recently been developed. For example, there can be mentioned driver IC's where pads are arranged only on two confronting peripheral portions. Where a driver IC of this type is loaded, the third conductor layer 32 is not necessary, and multilayer wiring is completed with the second conductor layer 18 as in the above-mentioned first embodiment.

Referring to FIGS. 5 and 6, the second insulator layer 31 is formed as a thick film on the second conductor 18 by using an organic insulator such as a polyimide resin. For example, this second insulating layer 31 composed of a polyimide resin is formed in the following manner. Ordinarily, a polyimide resin has a poor thixotropic property and hence, a low printability. Accordingly, an inorganic or organic powdery filler is incorporated into a polyimide resin so as to improve the thixotropic property, and the filler-incorporated polyimide resin is screen-printed to form the second insulator layer 31. In order to improve the insulating property between the conductor layers, the second insulator layer 31 is formed as a thick film having a thickness of about 15 μm. Then, the third conductor layer 32 is formed as a thin film on the second insulator layer 31. For example, this third conductor layer 32 is formed in the following manner. A Cr layer having a thickness of 300 Å is first formed on the entire surface by the vacuum deposition of Cr or the like means, and a Cu layer having a thickness of 1 μm is formed on the Cr layer. Then, this thin layer is patterned according to a method similar to the method adopted for formation of the second conductor layer 18, whereby the third conductor layer 32 is formed. Then, the driver IC 19 is loaded and secured to the third conductor layer 32 according to the same method as adopted in the first embodiment. The present embodiment is different from a conventional thin film multi-layer wiring structure constructed by using only a polyimide resin or the like in the point that since the wiring is mainly constructed by the first and second conductor layers (15 and 18), the wiring by the third conductor layer 32 can be simplified, with the result that the rejection rate of patterning can be reduced. Other effects of the present embodiment are substantially the same as those attained in the first embodiment.

As is apparent from the foregoing detailed description, in each of the foregoing embodiments, the multilayer wiring portion is constructed by using a conductor composed mainly of Cu. This is because Cu is cheap and has a high electric conductivity (low conductor resistance) and a high heat resistance. The material of the heat-generating resistor 17 and the material of the protecting film 22 are not limited to the above-mentioned $Ta_2N$ and $SiO_2$-$Ta_2O_5$. $SiO_2$, but other appropriate materials can be used.

Figure 7:
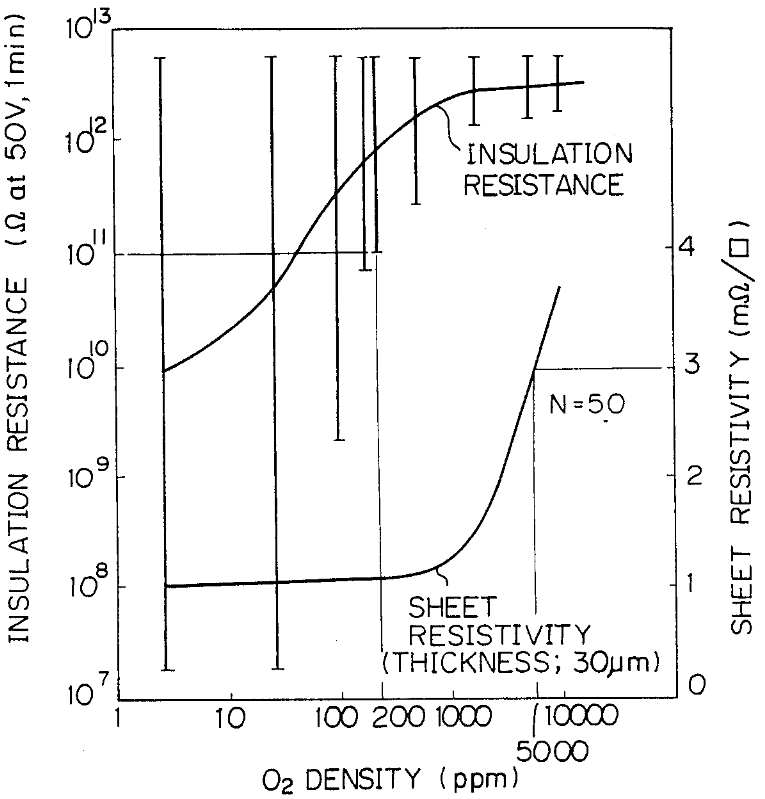
FIG. 7 is a diagram showing experimental results for the relationship of $O_2$-density of the inert gas atmosphere, in which the glass paste is fired, to the insulation resistance between the upper thin-film conductor layer and the lower thick-film conductor layer, and also to the sheet resistivity of the Cu thick-film conductor layer.
Figure 8:
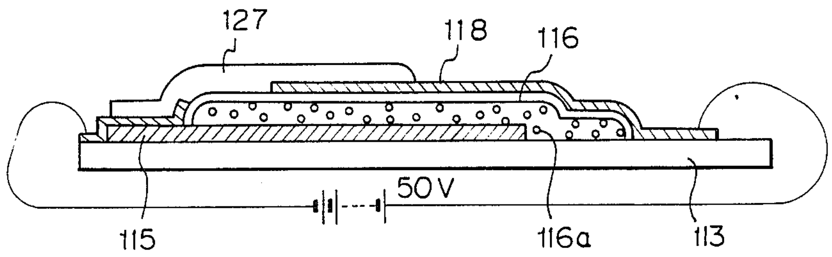
FIG. 8 is a schematic sectional view of a test sample used in the experiments.

FIG. 7 shows experimental results of characteristics of the ratios of $O_2$ density in the $N_2$ atmosphere for firing the glass paste to the insulation resistance between the upper thin-film conductor layer and the lower thick-film conductor layer and also to the sheet resistivity of the thick film conductor layer. The experiments were carried out by using a test sample as shown in FIG. 8, in which the Cu thick film conductor layer 115 which can be fired at a nominal firing temperature of 600° C. was formed on the 96% alumina substrate 113. The crystalline glass **116*a* which can be fired at a nominal firing temperature of 600° C. was printed and fired twice by using a 325 mesh stainless screen, and then the vitrous glass 116*b* was printed and fired on the first glass layer 116*a* by using the 325 mesh stainless screen. Finally, the upper thick film conductor layer 118 of Cr-Cu was formed on the glass layer 116*b*. The upper conductor layer 118 was patterned by a photolithography process and then coated with a protective layer 127 of silicone resin. The initial insulation resistance between the thick-film conductor layer 115 and the thin-film conductor layer 118** was measured one minute after a voltage of 50 V was applied, in comparison with the variation of $O_2$ density at the so-called burn out zone of the firing furnace. The sheet resistivity of the thick-film conductor layer was also measured.

As can be seen from FIG. 7, it was clear that the insulation resistance varied in accordance with the change in $O_2$ density and that the sheet resistivity varied largely when the $O_2$ density exceeded about 1000 ppm.

Generally, it is thought that the upper limit of the sheet resistivity for achieving desired characteristics of the Cu thick-film conductor layer is 3 $m\Omega/cm^2$. This fact results in the condition that the $O_2$ density should be below 5000 ppm.

On the other hand it is also thought that the insulation resistance must be above $10^{11}\Omega$ to ensure reliability of the insulator. From this, it was derived that $O_2$ density should be above 200 ppm. In the prior art, the glass paste is usually fired in an $N_2$ atmosphere containing a low density $O_2$ below $5\sim50$ ppm.

Figure 9:
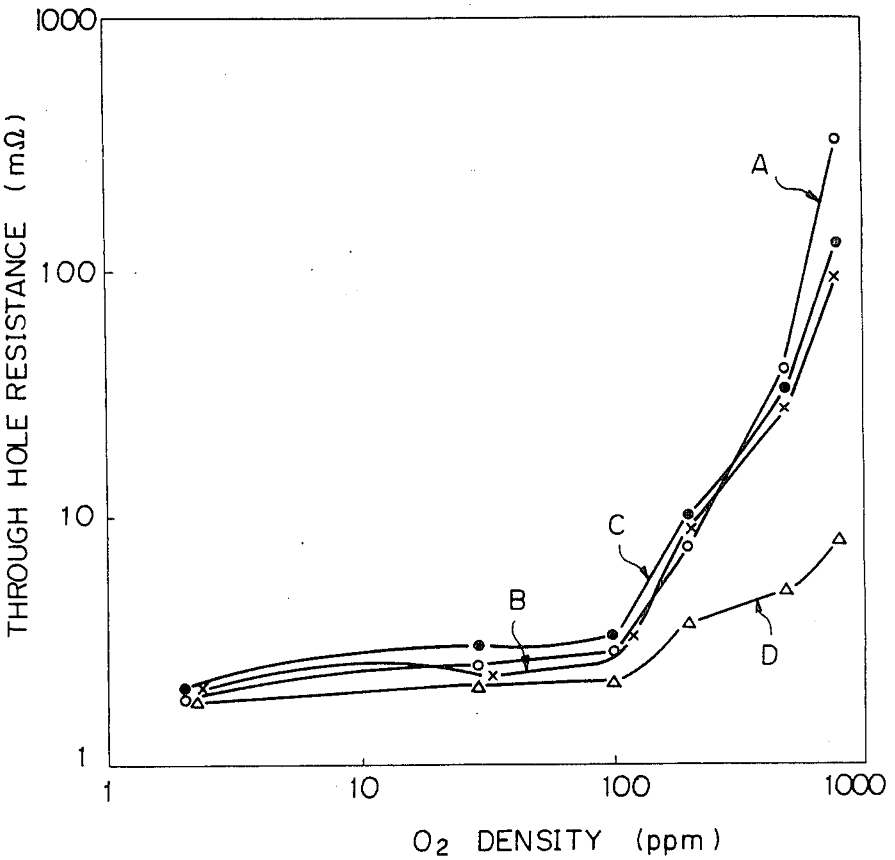
FIG. 9 is a diagram of experimental results showing a relationship between the $O_2$ density and the throughhole resistance, in relation to the kinds of solvent in which the substrate is to be dipped to remove the copper oxide.

FIG. 9 shows experimental results of a relationship between the throughhole resistance and the $O_2$ density at the burn-out zone, in the course of firing the glass paste. Various organic acid-containing solvents were used to remove the oxide formed on the thick-film conductor layer. In FIG. 9, A shows the solvent which contains 4% by weight phosphoric acid, B the solvent of orthodichlorobenzene which contains no organic acid, and C shows no surface treatment, i.e., no step for removal of the oxide. A or C are prior art. D shows the present invention, in which the solvent of orthodichlorobenzene contains 20% carbolic acid by weight and 20% ABS (Alkylbenzene Sulphonate) as a surface-active agent. As can be seen from FIG. 9, D gave the best result for decreased throughhole resistance. This is because the oxide of Cu and the glass containing Pb can be weakly etched.

Figure 10:
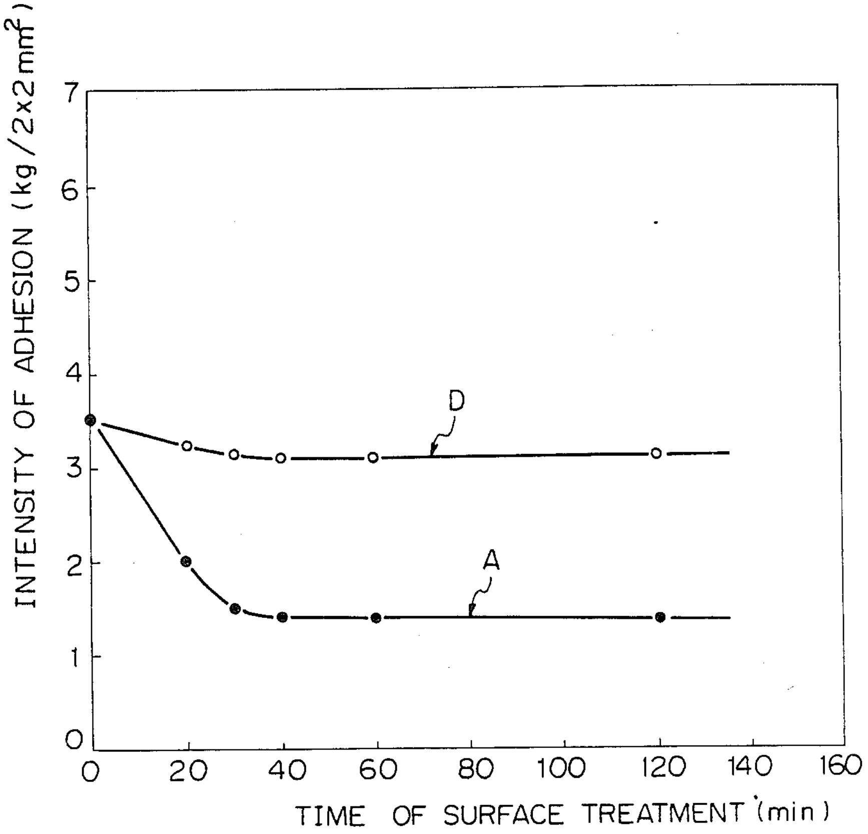
FIG. 10 is a diagram of experimental results showing a relationship between the type of surface treatment, i.e., the time of immersion in the solvent and the intensity of the adhesion of the Cu thick-film layer onto the substrate, in relation to the kinds of the solvent.

FIG. 10 shows experimental results of a relationship between the time of surface treatment (time of immersion of substrate in the solvent) and the intensity of adhesion of Cu thick-film layer to the substrate. A shows the solvent of 4% phosphoric acid containing no organic acid, according to the prior art. D shows the present invention in which the solvent of orthodichlorobenzene contains 20% carbolic acid and 20% ABS. As can be seen from FIG. 10, according to the present invention, a decrease in the intensity of adhesion of the Cu thick-film layer to the substrate could be prevented.

Figure 11:
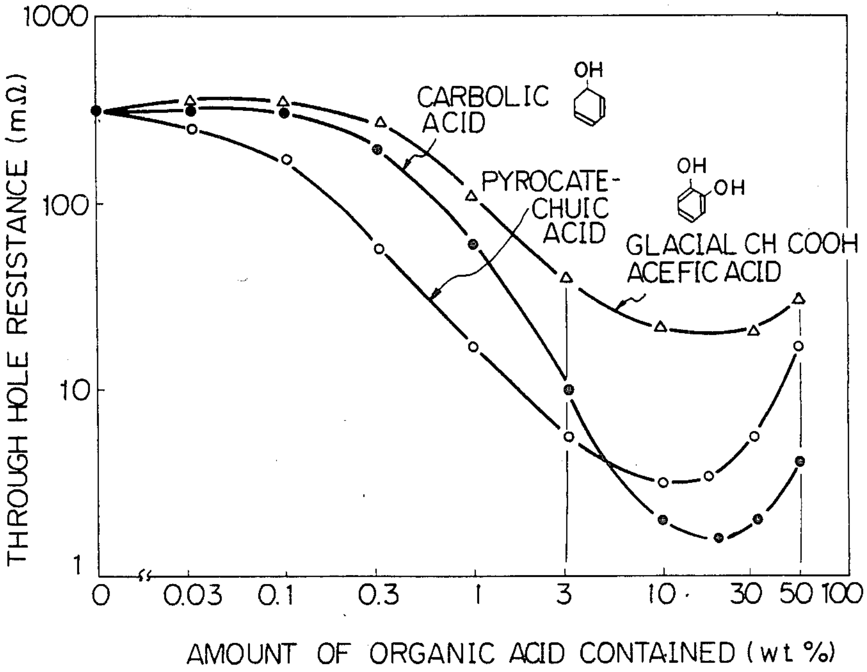
FIG. 11 is a diagram of experimental results showing the relationship between the amount of organic acid to be contained in the solvent and the throughhole resistance, in relation to the kinds of organic acids.

FIG. 11 shows experimental results of the amount (weight %) of the organic acid contained in the solvent in relation to the throughhole resistance. The thick-film Cu layer was fired in the $N_2$ atmosphere containing 700 ppm of $O_2$. Copper oxide about 5000 Å in thickness was formed on the throughholes of the exposed Cu surface. Three kinds of organic acid, i.e., carbolic acid (●—●), pyrocatechuic acid (○—○), and glacial acetic acid (Δ—Δ), were dissolved in the solvent of orthodichlorobenzene containing the ABS surface-active agent. The amounts of organic acids were changed. The thin-film conductor layer was formed after the surface treatment for removal of the copper oxide was carried out by immersion in three kinds of solvents containing three kinds of organic acids. The throughhole resistance was then measured.

As can be seen from FIG. 11, when the amounts of organic acids were 3 to 50% by weight, the throughhole resistance could be largely decreased.

Finally, it was confirmed that the surface-active agent, i.e., ABS, contained in the solvent is only for improving the surface wetness and can be dispensed with.

As is apparent from the foregoing description, the thermal recording head of the present invention can be easily fabricated by appropriately combining thick film or thin film conductor layers and thick film insulator layers, forming the first insulator layer as a thich glass film and skillfully utilizing the merits of the thick and thin films. Moreover, the yield can be increased and the manufacturing cost can be reduced. Still further, high-density wiring, high printing speed, and high quality printed letters (high resolving degree) can be realized, and the reliability and performance can be improved.

We claim:

1. A thermal recording head comprising an insulating substrate having thereon a heat generating resistor pattern made of a thin-film resistor, a predetermined electrode pattern including a common power supply electrode pattern and a common power grounded electrode pattern portion, for supplying power to the resistor pattern, and a controlling electrode pattern portion, said predetermined electrode pattern being made of a thick-film copper paste by printing, a first insulator layer formed of a thick glass film arranged on said predetermined electrode pattern, a further layer of said thin-film resistor on said first insulatior layer, a second conductor layer formed of a respective thin film on said thin-film resistor, and switching means provided on said second conductor layer for controlling the supply of the power to the resistor pattern, wherein said switching means is controlled by said controlling electrode pattern portion.

2. A thermal recording recording head according to claim 1, wherein said switching means comprises switches elements composed of integrated circuits.

3. A thermal recording head having a multi-layer wiring structure with active elements at a high density, which comprises a substrate, a first conductor layer formed of a thick film and arranged on the substrate, a first insulator layer formed of a thich glass film and arranged on the first conductor layer, a heat-generating resistor layer formed of a respective thin film and arranged on the first insulator layer, a second conductor layer formed of a respective thin film and arranged on the resistor layer, and said active elements arranged selectively on the second conductor layer and the first insulator layer.

4. A thermal recording head as set forth in claim 3, wherein said thick film of the first conductor layer is of Cu, the first insulator layer is formed of a glass capable of being sintered in an $N_2$ atmosphere, and said thin film of the second conductor layer includes at least one layer of Cr, NiCr, W, Ta, Ti, Ni, Cu, Au, Pd or Al.

5. A thermal recording head as set forth in claim 3, wherein said thick glass film of said first insulator layer an integrally formed laminated structure comprising a first glass layer formed of a crystalline glass and a second glass layer formed of an amorphous glass and arranged on the first glass layer.

6. A thermal recording head as set forth in claim 3, wherein said thick glass film of said first insulator layer has an integrally formed laminated structure comprising a first glass layer formed of an amorphous glass having a high softening point and a second glass layer formed of an amorphous glass having a lower softening point than that of the amorphous glass of the first glass layer and arranged on the first glass layer.

7. A thermal recording head as set forth in claim 3, wherein said first and second conductor layers have a connection therebetween, and a nickel plating layer is provided between the first conductor layer and the second conductor layer at said connection therebetween.

8. A thermal recording head having a multi-layer wiring structure with active elements at a high density, which comprises a substrate, a first conductor layer formed of a respective thick film and arranged on the substrate, a first insulator layer formed of a thick glass film and arranged on the first conductor layer, a heat-generating resistor layer formed of a respective thin film and arranged on the resistor layer, a second conductor layer formed of a respective thick film and arranged on the second conductor layer, a third conductor layer formed of a respective thin film and arranged on the second insulator layer, and said active elements being selectively arranged on the third conductor layer and the second insulator layer.

9. A thermal recording head as set forth in claim 8, wherein said thick film of the first conductor layer is of Cu, said thick glass layer of the first insulator layer is formed of a glass capable of being sintered in an $N_2$ atmosphere, and said thin film of the second conductor layer includes at least one layer of Cr, NiCr, W, Ta, Ti, Ni, Cu, Au, Pd or Al.

10. A thermal recording head as set forth in claim 8, wherein said thick glass film of the first insulator layer has an integrally formed laminated structure comprising a first glass layer formed by printing a crystalline glass and a second glass layer formed of an amorphous glass and arranged on the first glass layer.

11. A thermal recording head as set forth in claim 8, wherein said thick glass film of the first insulator layer has an integrally formed laminated structure comprising a first glass layer formed of an amorphous glass having a high softening point and a second glass layer formed of an amorphous glass having a lower softening point than that of the amorphous glass of the first glass layer and arranged on the first glass layer.

12. The thermal recording head as in claim 3, wherein said active elements are arranged on said second conductor layer.

13. A thermal recording head as in claim 8, wherein said active elements are arranged on said third conductor layer.

* * * * *

UNITED STATES PATENT AND TRADEMARK OFFICE

CERTIFICATE OF CORRECTION

PATENT NO. : 4,689,638

DATED : August 25, 1987

INVENTOR(S) : Matsuzaki et al.

It is certified that error appears in the above-identified patent and that said Letters Patent is hereby corrected as shown below:

Col. 3, line 2, change ", also" to --. Also, no--.

In Fig. 11, change "ACEFIC" to --ACETIC--.

Signed and Sealed this

Twenty-fourth Day of May, 1988

*Attest:*

DONALD J. QUIGG

*Attesting Officer*

*Commissioner of Patents and Trademarks*